(12) United States Patent
Wilcken

(10) Patent No.: US 11,641,875 B2
(45) Date of Patent: May 9, 2023

(54) SMOKING APPARATUS FILTRATION DEVICE AND RELATED TECHNOLOGIES

(71) Applicant: ACEROLA HOLDINGS LLC, Mesa, AZ (US)

(72) Inventor: Joseph Wilcken, Mesa, AZ (US)

(73) Assignee: ACEROLA HOLDINGS LLC, Mesa, AZ (US)

( * ) Notice: Subject to any disclaimer, the term of this patent is extended or adjusted under 35 U.S.C. 154(b) by 365 days.

(21) Appl. No.: 16/930,098

(22) Filed: Jul. 15, 2020

(65) Prior Publication Data

US 2021/0015149 A1 Jan. 21, 2021

Related U.S. Application Data

(60) Provisional application No. 62/874,348, filed on Jul. 15, 2019.

(51) Int. Cl.
| A24F 1/30 | (2006.01) |
| A24D 3/04 | (2006.01) |
| A24D 3/16 | (2006.01) |
| B01D 29/31 | (2006.01) |

(52) U.S. Cl.
CPC .......... *A24F 1/30* (2013.01); *A24D 3/04* (2013.01); *A24D 3/163* (2013.01); *B01D 29/31* (2013.01)

(58) Field of Classification Search
CPC .......... A24D 3/04; A24D 3/067; A24D 3/163; A24F 1/30; A24F 1/26; A24F 1/00; A24F 1/14; A24F 13/04; B01D 29/31; F01N 3/02; F23J 15/04; F23J 15/00

USPC .......................................... 131/173, 328–329
See application file for complete search history.

(56) References Cited

U.S. PATENT DOCUMENTS

| 2,362,891 A | * | 11/1944 | Dunkelberger | ........... A24F 1/00 |
| | | | | 131/210 |
| 2,804,079 A | | 8/1957 | Wang | ............................. 131/207 |
| 4,253,475 A | | 3/1981 | Schreiber et al. | ......... A24F 1/30 |
| 4,257,432 A | | 3/1981 | Griffith et al. | ............. A24F 1/30 |
| 4,357,948 A | | 11/1982 | Schweitzer et al. | ....... A24F 1/30 |
| 6,067,993 A | * | 5/2000 | Mahoney, III | ............ A24F 1/30 |
| | | | | 131/212.2 |

(Continued)

OTHER PUBLICATIONS

International Search Report and Written Opinion issued in PCT application No. PCT/US20/42176 dated Dec. 3, 2020, 8 pgs.

(Continued)

*Primary Examiner* — Dennis R Cordray
(74) *Attorney, Agent, or Firm* — Hayes Soloway P.C.

(57) ABSTRACT

A filtration apparatus for use in a smoking apparatus has an inlet port and an outlet port. A filter pass-through tube is connected between the inlet and outlet ports. The filter pass-through tube has a blockage structure therein. A plurality of dispersion ports are positioned on a first side of the blockage structure and a plurality of collection ports positioned on a second side of the blockage structure. A filter chamber having a quantity of filtration material is positioned external of the filter pass-through tube and in fluid communication with the plurality of dispersion and collection ports. The filtration apparatus may be used in a smoking apparatus having a bowl, a water-impervious vessel having a stem extending therefrom, and a draw tube in fluid connection with the water-impervious vessel.

20 Claims, 10 Drawing Sheets

(56) References Cited

U.S. PATENT DOCUMENTS

| | | | |
|---|---|---|---|
| 6,345,625 B1* | 2/2002 | Chew | A24D 3/04 131/201 |
| 8,534,296 B2 | 9/2013 | Groff | A24F 1/30 |
| 2006/0207621 A1* | 9/2006 | Shraiber | A24F 1/30 131/173 |
| 2011/0186064 A1* | 8/2011 | Patel | A24F 47/00 131/173 |

OTHER PUBLICATIONS

International Preliminary Report on Patentability issued in PCT application No. PCT/US20/42176 dated Jan. 18, 2022, 6 pgs.

* cited by examiner

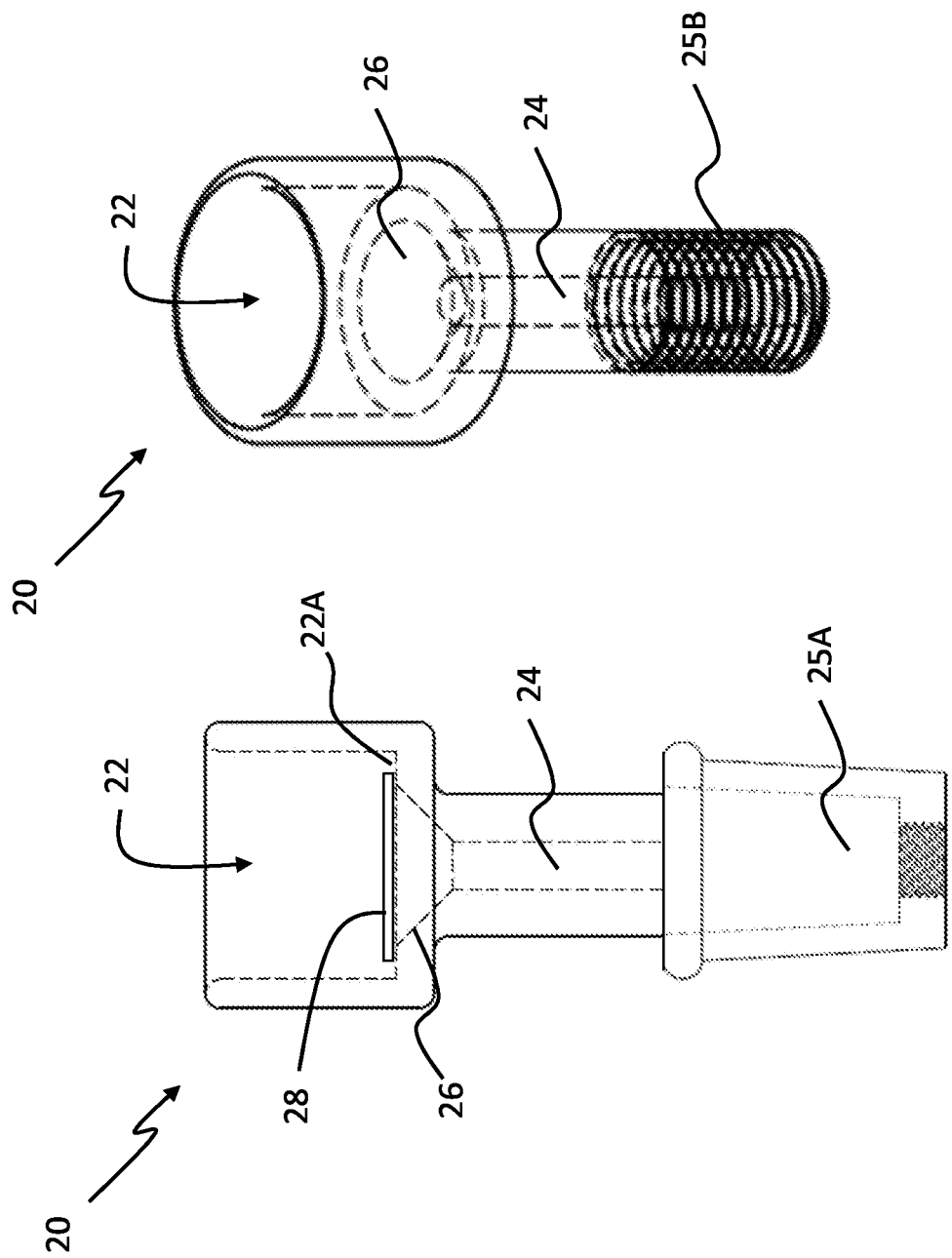

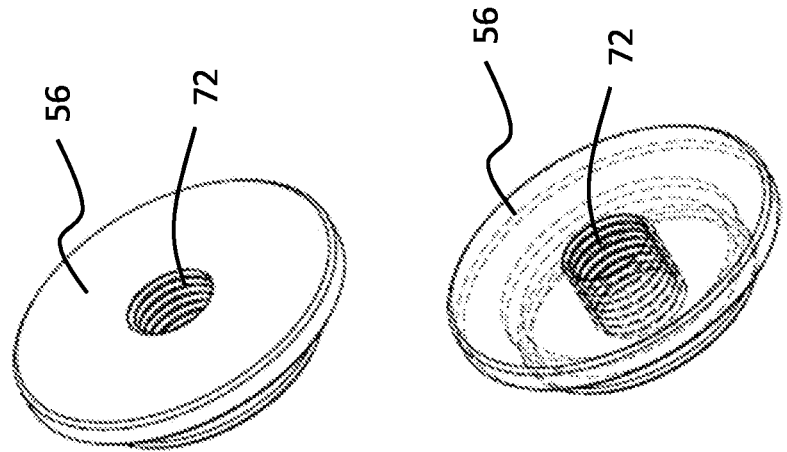
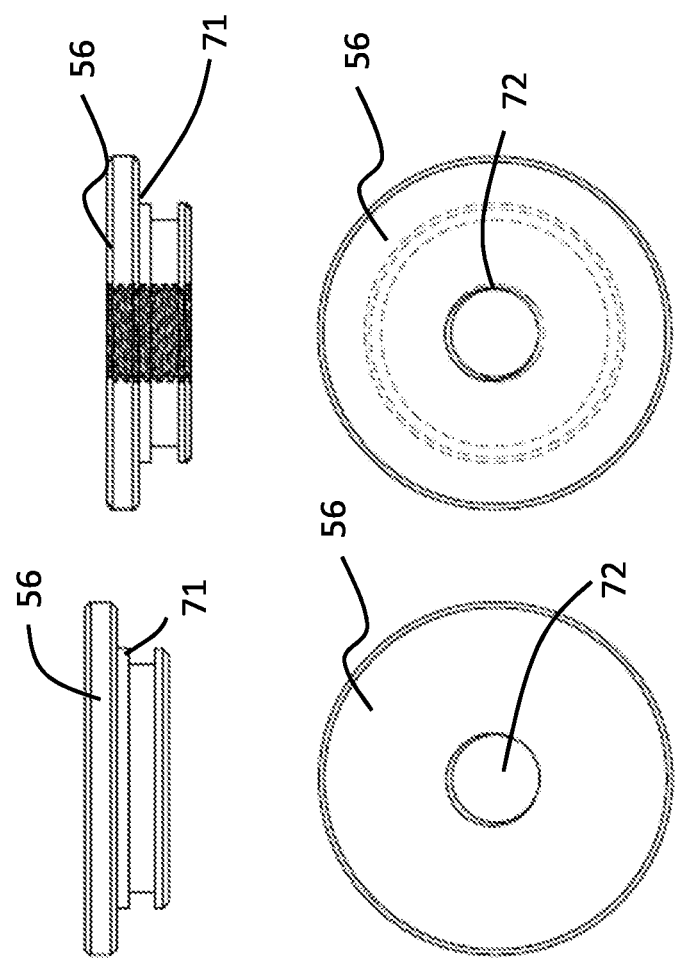
FIG. 10C
FIG. 10B
FIG. 10A

SMOKING APPARATUS FILTRATION DEVICE AND RELATED TECHNOLOGIES

CROSS REFERENCE TO RELATED APPLICATION

This application claims benefit of U.S. Provisional Application Ser. No. 62/874,348 entitled, "Smoking Apparatus Filtration Device and Related Technologies" filed Jul. 15, 2019, the entire disclosure of which is incorporated herein by reference.

FIELD OF THE DISCLOSURE

The present disclosure is generally related to filtration devices and more particularly is related to a smoking apparatus filtration device and related technologies.

BACKGROUND OF THE DISCLOSURE

A bong is a device generally used for smoking a substance, namely, tobacco, cannabis, or other herbal substances. The bong, which may also be known as a water pipe, generally includes a bowl suitable for holding the substance for smoking and a stem which extends into an air-and-water-impervious vessel. A draw pipe or tube is connected to the vessel, such that when a user inhales on the draw pipe or tube, it causes a negative pressure within the vessel which draws smoke from the smoking substance through the stem and into the vessel. When the smoke enters the vessel, it is passed through a quantity of water in the vessel which purifies and cleanses the smoke, removing tar, ash, and other contaminants. This purification and cleaning improves the smoking experience for the user. While bongs and similar devices have been used for centuries, users often desire to further improve the smoking experience by increasing the quality and/or quantity of filtration of the smoke. While filtration devices have been used conventionally, many of them can negatively affect the operation of the bong, for example, by decreasing velocity, flow, or other fluid dynamics of the smoke within the bong.

Thus, a heretofore unaddressed need exists in the industry to address the aforementioned deficiencies and inadequacies.

SUMMARY OF THE DISCLOSURE

Embodiments of the present disclosure provide a filtration apparatus for use in a smoking apparatus. Briefly described, in architecture, one embodiment of the system, among others, can be implemented as follows. The filtration apparatus has an inlet port and an outlet port. A filter pass-through tube is connected between the inlet and outlet ports. The filter pass-through tube has a blockage structure therein. A plurality of dispersion ports are positioned on a first side of the blockage structure. A plurality of collection ports are positioned on a second side of the blockage structure. A filter chamber having a quantity of filtration material is positioned external of the filter pass-through tube and in fluid communication with the plurality of dispersion and collection ports.

Embodiments of the present disclosure provide a smoking apparatus and related systems and methods. Briefly described, in architecture, one embodiment of the apparatus, among others, can be implemented as follows. The smoking apparatus has a bowl capable of holding a smoking substance. A water-impervious vessel has a stem extending therefrom, wherein the bowl is in fluid communication with the stem. A filtration apparatus is positioned in fluid communication with the stem, wherein the filtration apparatus has an inlet port and an outlet port and a filter pass-through tube connected between the inlet and outlet ports, wherein the filter pass-through tube has a blockage structure therein. A plurality of dispersion ports are positioned on a first side of the blockage structure. A plurality of collection ports are positioned on a second side of the blockage structure. A filter chamber having a quantity of filtration material is positioned external of the filter pass-through tube and in fluid communication with the plurality of dispersion and collection ports. A draw tube is in fluid connection with the water-impervious vessel.

The present disclosure can also be viewed as providing a filtration apparatus for use in filtering smoke within a smoking apparatus. Briefly described, in architecture, one embodiment of the apparatus, among others, can be implemented as follows. An inlet port and an outlet port are provided, where the inlet port receives a quantity of smoke from a smoking substance. A filter pass-through tube is connected between the inlet and outlet ports, the filter pass-through tube having a blockage structure therein. A plurality of dispersion ports are positioned on a first side of the blockage structure. A plurality of collection ports are positioned on a second side of the blockage structure. A filter chamber has a quantity of filtration material positioned external of the filter pass-through tube and in fluid communication with the plurality of dispersion and collection ports. The quantity of smoke moves within the filter pass-through tube, exits the plurality of dispersion ports, passes through the quantity of filtration material to thereby filter the quantity of smoke, and enters the plurality of collection ports.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2-3 are illustrations of the bowl of the smoking apparatus having a filtration apparatus, in accordance with the first exemplary embodiment of the present disclosure.

FIGS. 10A-10C are detailed illustrations of the filter end cap of the filtration apparatus, in accordance with the first exemplary embodiment of the present disclosure.

DETAILED DESCRIPTION

Figure 1:
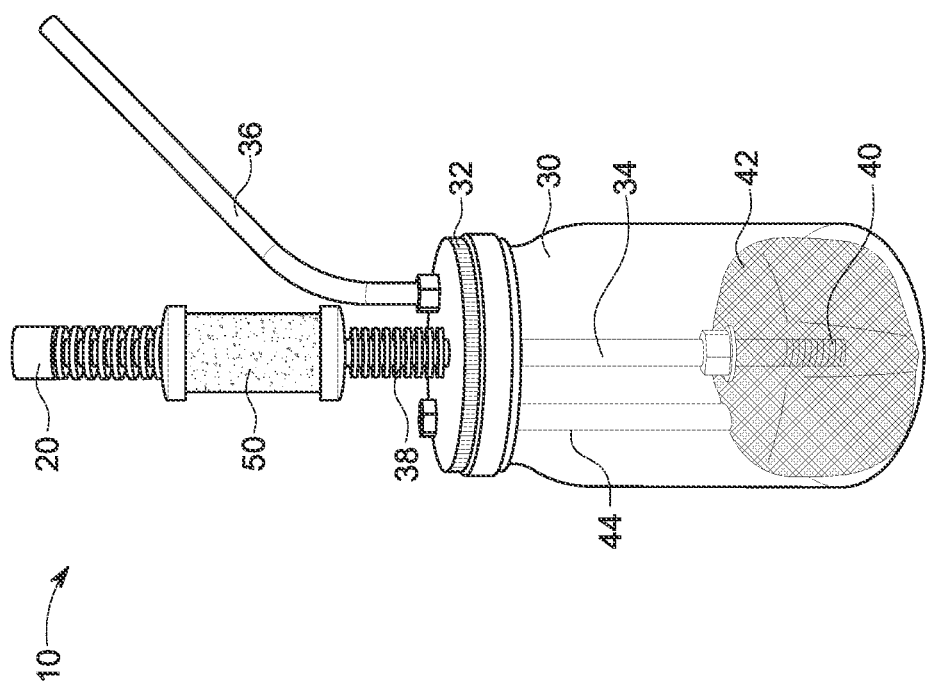
FIG. 1 is an illustration of a smoking apparatus having a filtration apparatus, in accordance with a first exemplary embodiment of the present disclosure.

FIG. 1 is an illustration of a smoking apparatus 10 having a filtration apparatus 50, in accordance with a first exemplary embodiment of the present disclosure. The smoking apparatus 10, which may be referred to herein as 'apparatus 10', includes a bowl 20 capable of holding a smoking substance (not shown). A water-impervious vessel 30 has a stem 34 extending therefrom. The vessel 30 may include a container constructed from glass or another water-impervious material. As shown, in one example, the vessel 30 may be a glass container with a threadable lid 32 connectable thereto. The lid 32 may include a plurality of openings for receiving the stem 34, and draw tube 36. The bowl 20 is in fluid communication with the stem 34 through an upper stem adapter 38 which interfaces between the bowl 20 and the lid 32. The adapter 38 may be sized to fit any size stem 34, such as 10 mm, 14 mm, or 18.8 mm stems 34, commonly used in glass water pipes and glass pipes. The stem 34 extends through the lid 32 and towards a floor of the vessel 30, which has a diffuser 40 enclosed within a screen basket 42. When the apparatus 10 is in use, a quantity of water (not shown) is placed within the vessel 30 such that it covers or substantially covers the screen basket 42. As shown, the draw tube 36 extends from an upper portion of the vessel 30, above a water level, to an outside atmosphere, such that a user can engage the draw tube 36 to inhale smoke from the vessel 30. The apparatus 10 further includes a purge tube 44 which can be used for cleaning the apparatus 10. The apparatus 10 further includes a filtration apparatus 50 which is positioned in fluid communication between the bowl 20 and the stem 34.

In further detail, FIGS. 2-3 are illustrations of the bowl 20 of the smoking apparatus 10 having a filtration apparatus 50, in accordance with the first exemplary embodiment of the present disclosure. In particular, FIG. 2 illustrates a bowl 20 with a female threaded connector 25A on the end of the shaft 24, by means of an adapter, whereas FIG. 3 illustrates the bowl 20 with a male threaded connector 25B on the end of the shaft 24. The type of connector 25A, 25B on the shaft 24 may vary depending on the type of connector or filter end cap 56 (FIG. 4) of the filtration apparatus 50.

With reference to FIGS. 2-3, the bowl 20 includes a bowl portion 22 having sidewalls and an open ceiling area, where the bowl portion 22 is sized to contain a smoking substance, such as tobacco, cannabis, an herbal-based smoking product, or another type of smoking substance. A shaft 24 is formed through the bowl 20, extending from a floor 22A of the bowl portion 22 to a terminating, lower end of the bowl 20. A portion of the floor 22A may include a bevel ramp 26, which may enlarge the interface between the floor 22A and the shaft 24, which may aid in preventing the smoking substance from blocking the opening of the shaft 24. A screen 28 (shown in FIG. 2 only) may be positioned overlying the bevel ramp 26 and the shaft 24 to maintain the opening of the bevel ramp 26. The exterior of the bowl 20 at the lower, terminating end includes a connector 25A/25B, such as threading, for mechanically connecting the bowl 20 to the filtration apparatus 50 or another structure within the apparatus 10.

While the dimensions and features of the bowl 20 can vary, in one example, the bowl portion 22 is approximately ⅝" in diameter with the bowl screen 28 having a substantially matching dimension, such that the screen 28 can overlie the bevel ramp 26 along the floor 22A of the bowl portion 22. The screen may be formed from a stainless steel or other material, which allows the passage of smoke but prevents or substantially prevents ash and other debris from gaining access to the shaft 24. The bevel ramp 26, in combination with the screen 28, may be used to allow proper dispersion of the suction across the bottom of the bowl portion 22. The shaft 24 may be ⅛" and serves to provide the point of highest restriction in the apparatus 10, such that the point of highest velocity is in the stem 34. The screen 28 and the bevel ramp 26 in the bowl portion 22 help diffuse the suction (from a user inhaling) across the entire width of the bowl portion 22 to provide an even burn of the smoking material.

Figure 4:
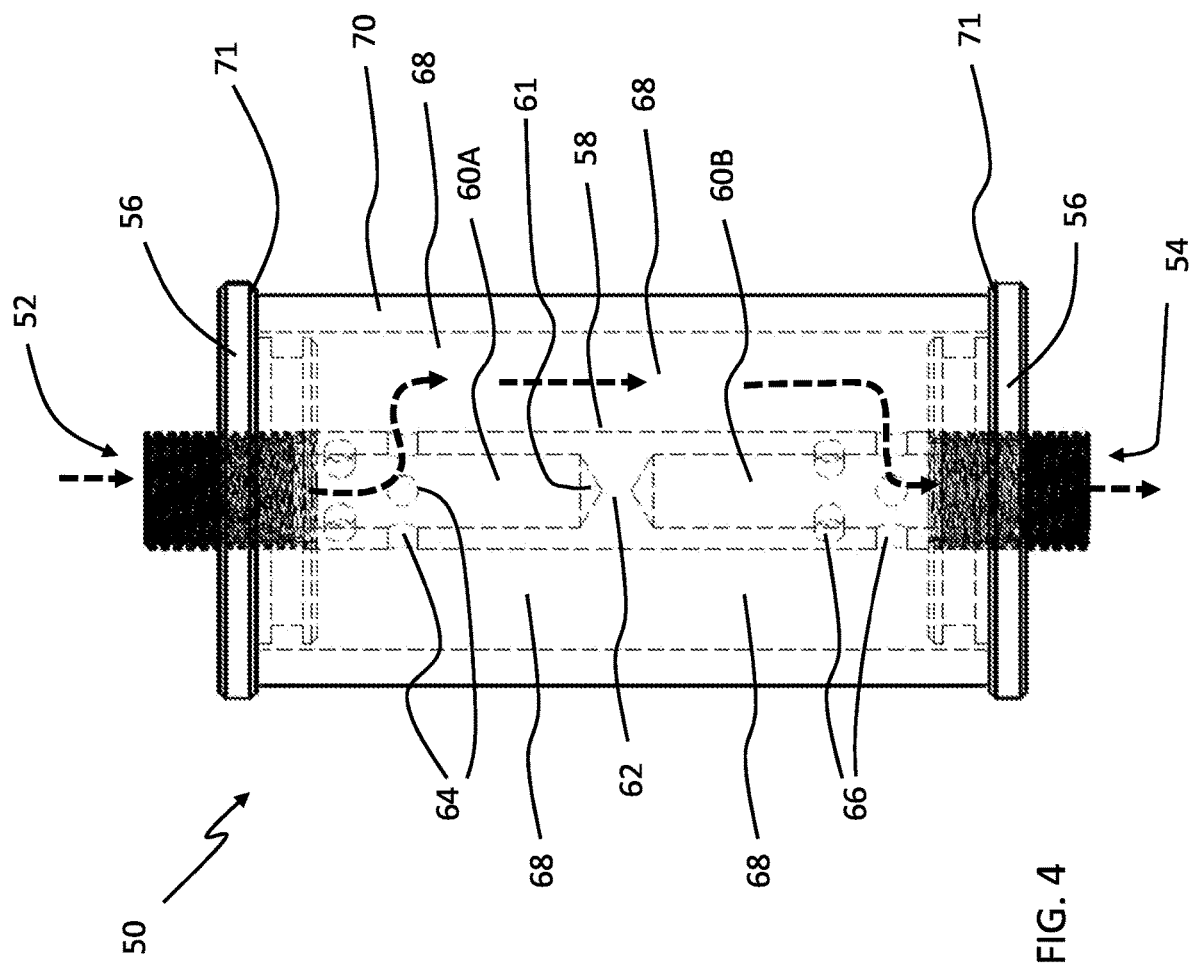
FIG. 4 is a detailed, cross-sectional illustration of the filtration apparatus, in accordance with the first exemplary embodiment of the present disclosure.
Figure 6:
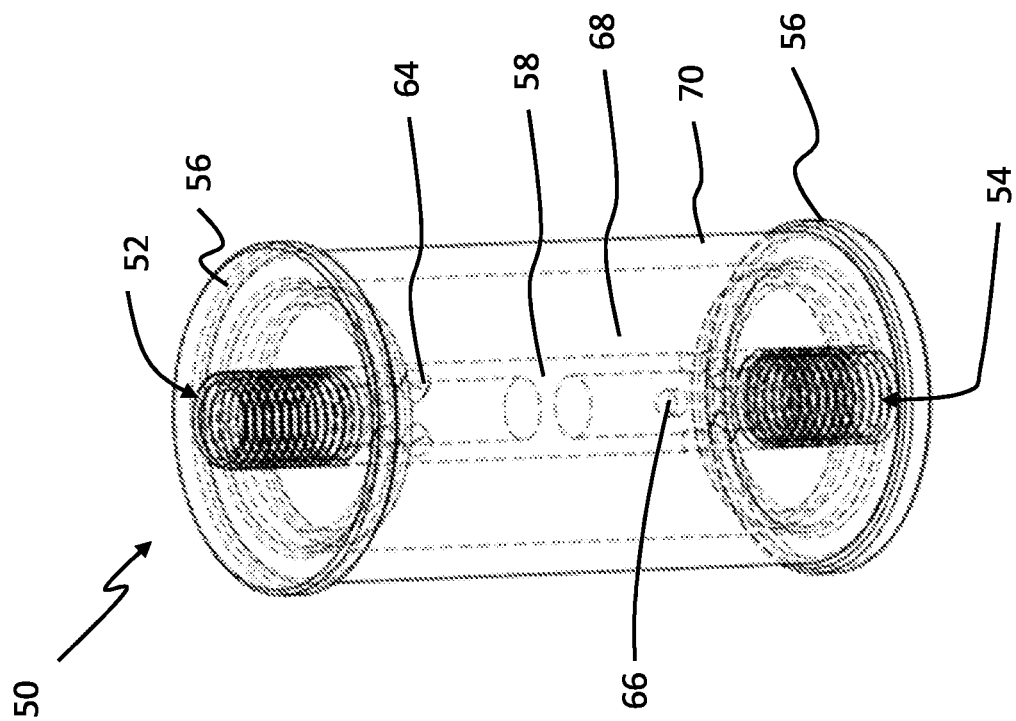
FIGS. 5-6 are illustrations of the filtration apparatus, in accordance with the first exemplary embodiment of the present disclosure.
Figure 5:
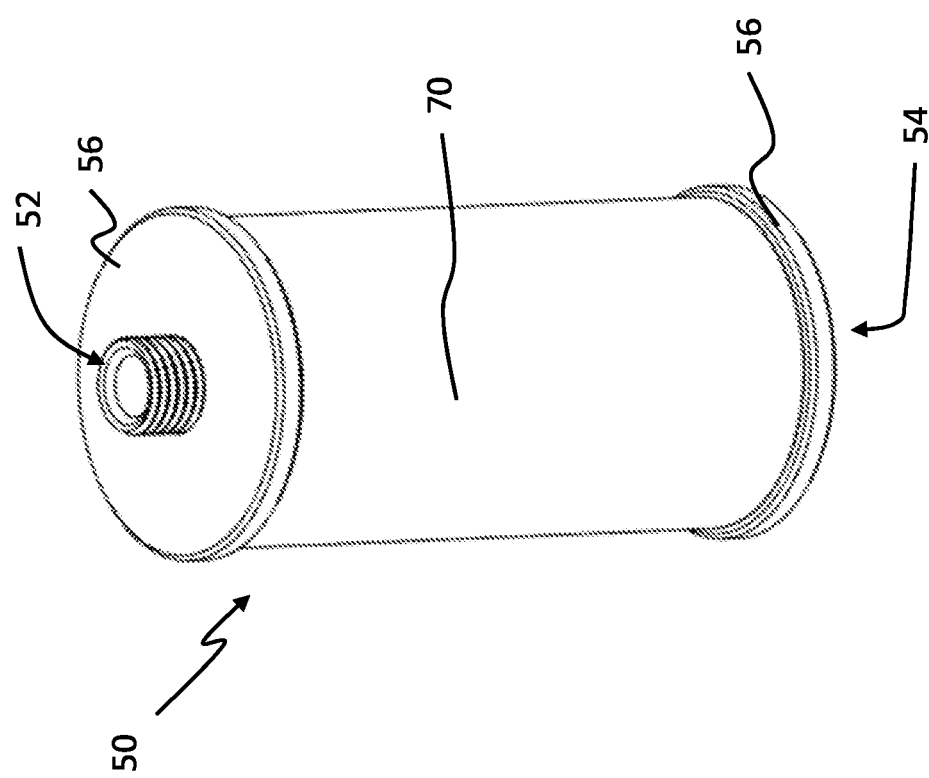
Figure 8:
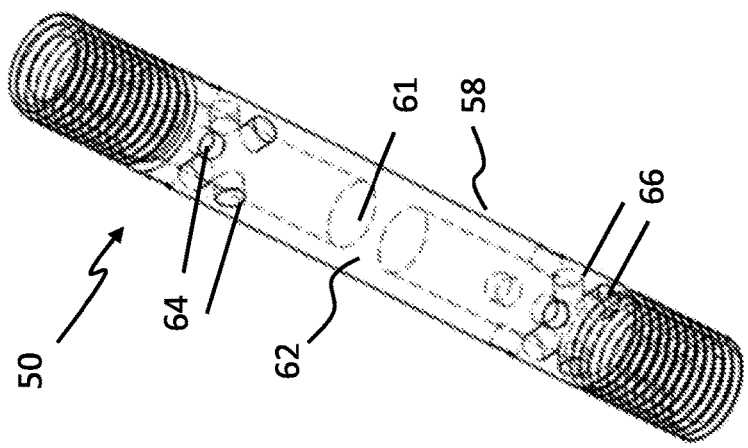
FIGS. 7-9 are detailed illustrations of the filter pass-through tube of the filtration apparatus, in accordance with the first exemplary embodiment of the present disclosure.
Figure 7:
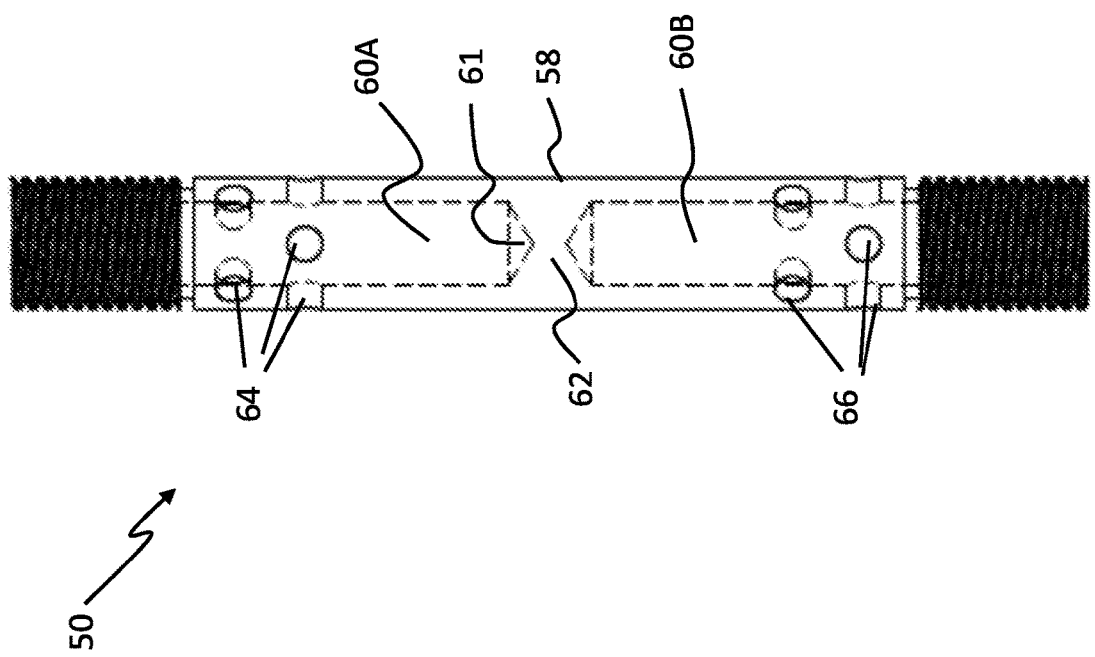
Figure 9:
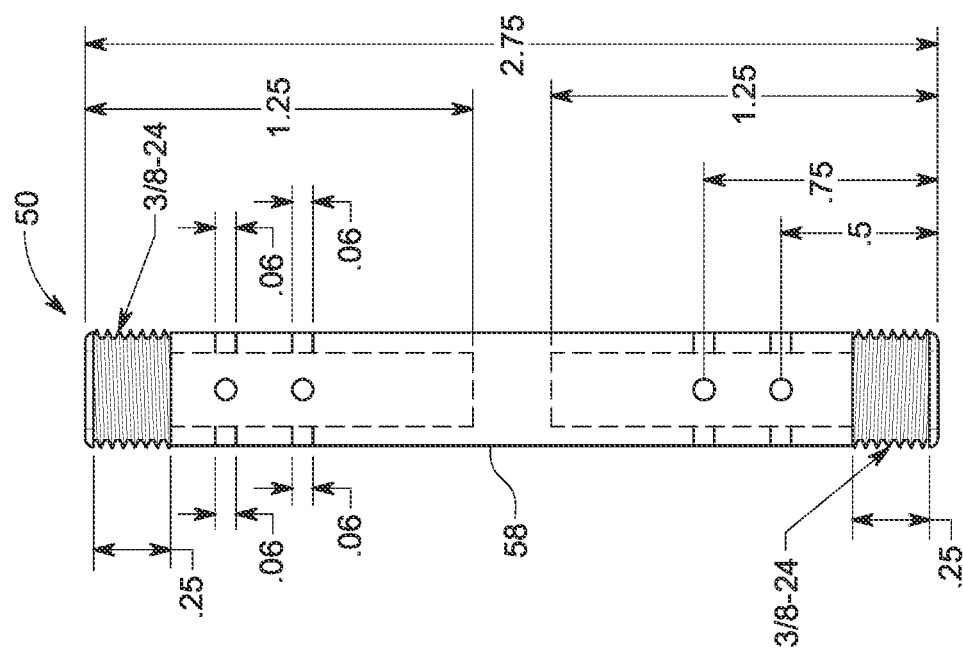

Once the smoke moves from the stem 24 of the bowl 20, it enters the filtration apparatus 50 at a high velocity. FIG. 4 is a detailed, cross-sectional illustration of the filtration apparatus 50, in accordance with the first exemplary embodiment of the present disclosure, while FIGS. 5-6 are illustrations of the filtration apparatus 50, in accordance with the first exemplary embodiment of the present disclosure. As shown, the filtration apparatus 50 includes an inlet port 52 and an outlet port 54. Both the inlet port 52 and the outlet port 54 are positioned in a filter end cap 56 positioned at either end of the filtration apparatus 50, respectively. The filter end caps 56 may have external threading, as shown, or in other designs, internal threading to receive the bowl 20 and the stem 34, or other structures. A filter pass-through tube 58 is connected between the inlet and outlet ports 52, 54. FIGS. 7-9 are detailed illustrations of the filter pass-through tube 58 of the filtration apparatus 50, in accordance with the first exemplary embodiment of the present disclosure. FIG. 9, in particular, lists exemplary dimensions for the filter pass-through tube 58, however other dimensions may also be used. As shown in all figures, the filter pass-through tube 58 is a substantially cylindrical tube having an interior path for transportation of smoke from the bowl 20 (FIG. 1) to the stem 34 (FIG. 1).

Specifically, with reference to FIGS. 4-9 together, the interior path includes an upper interior path 60A, or dispersion area, and a lower interior path 60B, or collection area, which are separated with a blockage structure 62 positioned therebetween. The block structure 62 prevents the flow of smoke through the filter pass-through tube 58 directly from the upper interior path 60A to the lower interior path 60B, such that the smoke is forced to exit one or more of a plurality of dispersion ports 64 positioned on a first, upper side of the blockage structure 62, as indicated by the broken arrows, and enter one or more of a plurality of collection ports 66 positioned on a second, lower side of the blockage structure 62. Through the blockage structure 62 and the corresponding dispersion and collection ports 64, 66, the path of travel of the smoke, as indicated by the broken arrows, is directed through a filter chamber 68 which contains a quantity of filtration material (shown in FIG. 1). The filter chamber 68 is positioned external of the filter pass-through tube 58 and is defined on an exterior surface by a filter glass tube sidewall 70 which encloses the filter chamber 68 and is mechanically connected to the filter end caps 56. O-rings 71, gaskets, or similar devices may be used to ensure a fluid and air tight connection therebetween, such that the filter chamber 68 is hermetically sealed.

With reference to FIGS. 1-9, in operation, the smoke from the bowl 20 enters into the filtration apparatus 50 through the inlet port 52, moves through dispersion area in the upper interior path 60A of the filter pass-through tube 58, through the one or more dispersion ports 64 and into the filter chamber 68 having the filter medium. The smoke travels through the filter material and enters the collection area of the lower interior path 60B of the filter pass-through tube 58 by the collection ports 66. The smoke is then directed down the filter pass-through tube 58 and exits the outlet port 54. In one example, the filter pass-through tube 58 includes eight (8) dispersion ports 64 spaced around the filter pass-through tube 58. The dispersion ports 64 may be positioned along varying radial positions and vertical positions of the sidewall of the filter pass-through tube 58, as shown in FIG. 4, which may allow for even dispersion of the smoke into the filter chamber 68. For example, the dispersion ports 64 may be located at two or more vertical levels spaced radially around the filter pass-through tube 58, such as at four places about the filter pass-through tube 58. The dispersion pattern of the smoke into the filter medium may be selected to maximize filtration of the smoke while minimizing negative fluid dynamic effects of the filtration apparatus 50 on the apparatus 10. In one example, each of the dispersion ports 64 is 0.077 inches in diameter, but any other dimension or size may also be used.

As shown in FIG. 4, the dispersion area of the upper interior path 60A of the filter pass-through tube 58 includes a floor 61. The floor 61 may be formed as the surface of the blockage 62 or otherwise formed within the filter pass-through tube 58. The presence of the floor 61, as well as characteristics of the floor 61, such as its height and/or depth from the dispersion ports 64 and collection ports 66, may influence success of aspects of the filtration apparatus 50, such as the filtration quality and the dispersion of the smoke within the filtration apparatus 50. For example, the presence of the floor 61 positioned a spaced distance below the dispersion ports 64, for example, by a distance equal to the height of the dispersion ports 64, or greater than the height of the dispersion ports 64 by 2, 3, 4, 5, or more multiples thereof. This spaced distance may provide for a secondary ash or debris trap, thereby preventing ash and other debris from entering the filter chamber 68. The floor 61 of the dispersion area, being set a distance from the dispersion ports 64, also allows for the dispersion area to act as a collector area of the heaviest of the tar byproduct produced from burning the plant, extending the service life by allowing the dispersion ports 64 to stay clear longer. As shown in FIG. 4, the floor 61 may be a concave structure which extends to a pointed tip.

The filter material or medium may include any type of filtration substance, such as activated carbon, loose activated charcoal, stamped disk charcoal filter, membrane filters, or other filter materials, which remove impurities, oils, or other materials from the smoke, or separate the smoke from waxy resin to clean the smoke. The filter chamber 68 may be approximately 2.0" long and approximately 1.0" in diameter, where the filter pass-through tube 58 occupies approximately ⅜" of space within the center of the filter chamber 68. The glass tube sidewall 70 may allow for viewing the filter material within the filter chamber 68 which can aid in assessing when the filter material is in need of replacement.

The amount of filtration may be based upon the length of the filter chamber 68, while the service life or intervals of the filter medium may be based on the width of the filter chamber 68.

As the smoke passes over the filter media, it goes into a lower pressure area, expands and cools. This reduces the velocity, cools the smoke further, and helps the tar fall out of suspension and stay in the filter. Once the smoke enters into the collection part of the lower interior path 60B of the filter pass-through apparatus 50, the smoke is more dense and purified. After the smoke passes through the filter medium in the filter chamber 68, it enters the filter pass-through tube 58 through the collection ports 66. The collection ports 66, in one example, may be 0.077 inches in diameter, with 8 collection ports 66 spaced around the radial sidewall and length of the filter pass-through tube 58. The smoke may then be inhaled by a user using an adapter, a mouthpiece, or another device, or the smoke may be otherwise utilized, as desired by the user.

FIGS. 10A-10C are detailed illustrations of the filter end cap 56 of the filtration apparatus 50, in accordance with the first exemplary embodiment of the present disclosure. The structure and features of the filter end cap 56 are apparent from the depictions in FIGS. 10A-10C. Notably, as shown, the filter end caps 56 may include an annular recess 72 for receiving the cylindrical edge of the filter chamber sidewall. An O-ring 71 or similar sealing structure may be used at the interface between the filter end cap 56 and the filter chamber sidewall. Depending on the interface with the shaft 24 of the bowl 20, the use of interior and/or exterior threaded engagements on the stems of the filter end caps 56 may be provided for mechanical connection to other components of the apparatus 10.

Figure 11:
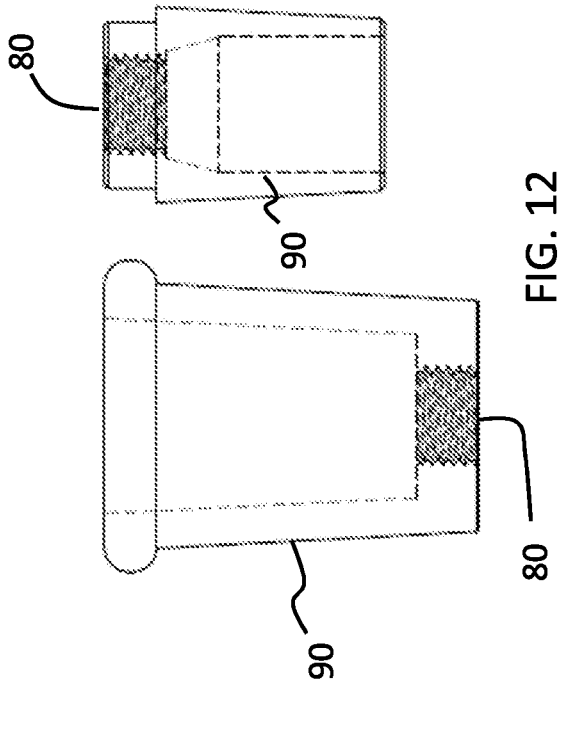
FIGS. 11-13 are illustrations of various adapters, in accordance with the first exemplary embodiment of the present disclosure.
Figure 12:
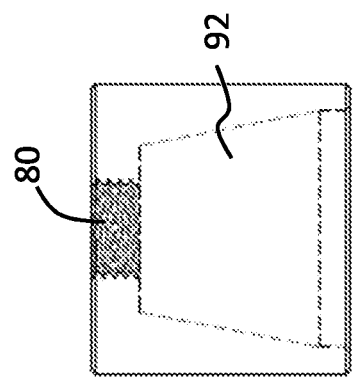
Figure 13:
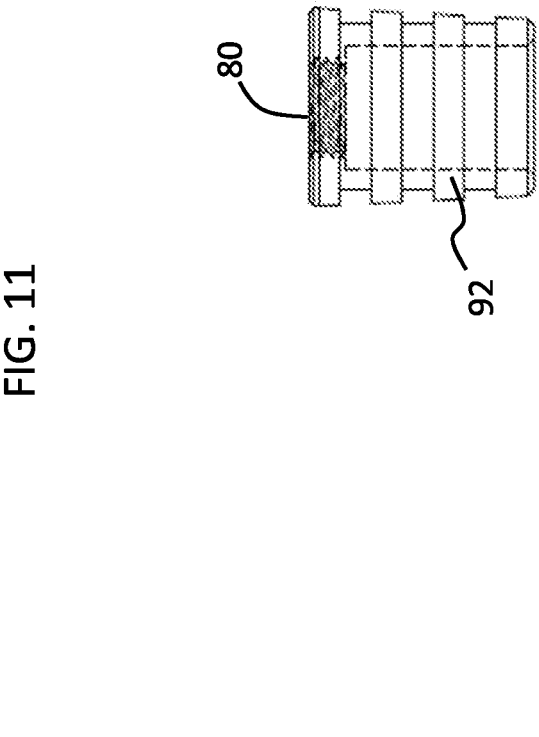

With reference to FIGS. 1-10C, after the smoke moves through the filtration apparatus 50, it moves down the stem 34 which smooths out turbulence in the smoke and increases the velocity of the smoke. Then, the smoke can be distributed to the user, or to another device, such as a mouthpiece or a hookah. For example, FIG. 11 illustrates cross-sectional images of an adapter 90 having a size of 14$mm$ which can be used to interface between the apparatus 10 and another device. Similarly, FIG. 12 illustrates cross-sectional images of an adapter 90 having a 19 mm size. Both of these adapters may include threaded connectors 80 which allow the adapters 90 to connect to the filter end caps 56 of the apparatus 10, and have an internal passageway for the smoke to travel to and/or from the apparatus. FIG. 13 illustrates cross-sectional images of filter hookah adapter 92 which may be used to interface the apparatus 10 to a hookah. FIGS. 11-13 illustrate both the upper and lower adapters 90/92, which may be used on either the inlet or outlet of the apparatus 10.

Figure 14B:
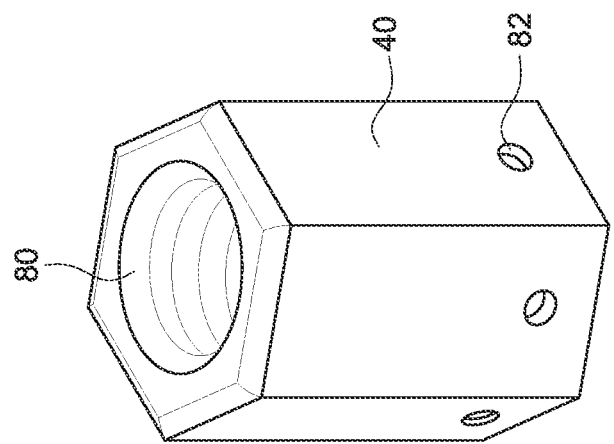
FIGS. 14A-14B are detailed illustrations of the diffuser, in accordance with the first exemplary embodiment of the present disclosure.
Figure 14A:
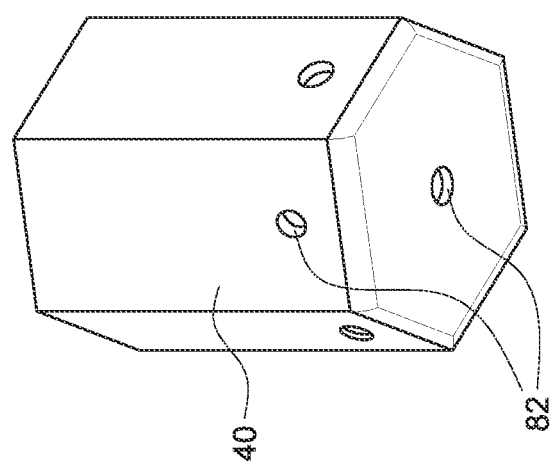

FIGS. 14A-14B illustrate images of a diffuser 40, which may be positioned at the end of the stem 34. As shown, the diffuser 40 includes a threaded connection 80 for engaging the stem 34 and a plurality of outlets 82 positioned equidistantly spaced around the circumference of the diffuser 40 and positioned along a bottom of the diffuser 40. When the smoke hits the diffuser at the bottom of the vessel 30, there is another pressure spike in the smoke as it is forced through the relatively narrow restriction of the outlets 82. In one example, the diffuser 40 is hexagonal in shape and has 7 outlets 82, one on each side and one on the bottom, with each of the outlets 82 being 0.059" in diameter. The smoke is condensed and forced through the outlets 82 of the diffuser 40, creating a Venturi Effect at each outlet. It is noted that the diffuser restriction of the outlets 82 can be tuned, such as within a ration range of 472:191 to 330:326.

As the smoke exits the diffuser 40, it contacts the water in the vessel 30 and it expands and cools again. This allows the heavier particulates to be stripped out due to the velocity of the smoke coming out of the diffuser 40. The screen basket 42 may slow the smoke's movement through the water which allows for a greater filtration time and also breaks up bubbles while still submerged. This causes more agitation in the water which promotes more stripping of contaminants from the smoke. The clean smoke then accumulates in the air chamber formed in the top of the vessel 30. When a negative pressure is applied to the air chamber, e.g., by inhalation of a user through the draw tube 36, the smoke is pulled through the draw tube 36 which compresses the smoke and accelerates it prior to arriving at the user's mouth. The final expansion and cooling of the smoke occurs in the user's mouth.

Figure 15:
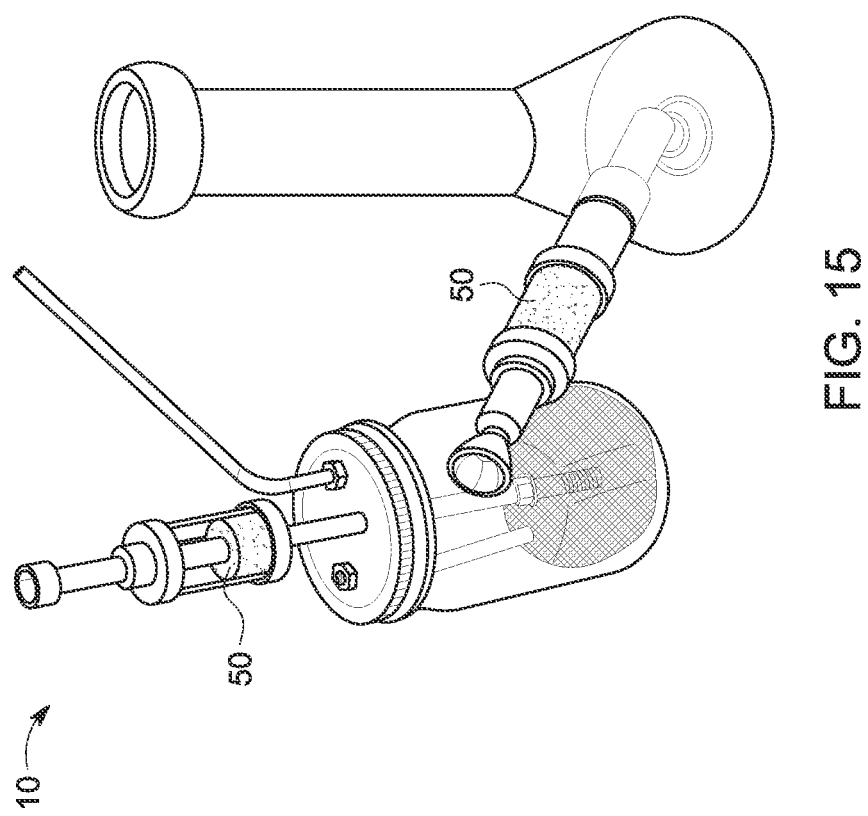
FIG. 15 provides an illustration of the apparatus having an alternative form, in accordance with the first exemplary embodiment of the present disclosure.

While FIG. 1 illustrates one example of the apparatus 10, FIG. 15 provides an illustration of the apparatus 10 having an alternative form, in accordance with the first exemplary embodiment of the present disclosure. Specifically, as shown, while one of the apparatuses 10 in the figure is substantially similar to the apparatus 10 of FIG. 1, the other apparatus 10 may have a different design where the filtration apparatus 50 is used in an open-top, bong-type device, whereby the user's mouth contacts a large circumference tube at the top of the device. It is noted that the filtration apparatus 50 may be used with any smoking device, all of which are considered within the present disclosure.

The materials that the apparatus 10 is constructed from may vary. In one example, all components are constructed from stainless steel, which has a low reactivity with heat. In another example, all components, including the filtration apparatus 50, may be formed from glass. In addition, the apparatus 10 may be formed from a combination of stainless steel and glass. While the apparatus 10 as described herein, and shown in FIG. 1, has a threaded screw top lid 32 which is removed from servicing the apparatus 10, other tops or lids may be used. For example, a push-and-twist type lid connector may be used to eliminate threading.

A number of additional variations with the apparatus 10 may exist. For example, terpene wafers may be used with or inside the filter to add flavor to the smoke. A terpene chamber may also be used for air to pass through like a bubbler. The filter medium may include granulated filtering materials or it may include replacement filters, such as charcoal replacement filters. The apparatus 10 may be sold or supplied with a cleaning kit. Additionally, it is noted that the smoke extraction process used after filtration may create a new tar, which may be consumable. For example, when the tar is a derivative of a cannabis extraction, the apparatus 10 described herein, or similar methods or systems, can isolate the tar such that it can be used as desired.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A filtration apparatus for use in a smoking apparatus, the filtration apparatus comprising:
    an inlet port and an outlet port;
    a filter pass-through tube connected between the inlet and outlet ports, the filter pass-through tube having a blockage structure therein;
    a plurality of dispersion ports positioned on a first side of the blockage structure;
    a plurality of collection ports positioned on a second side of the blockage structure; and
    a filter chamber having a quantity of filtration material, the filtration material being a non-liquid filtration substance, wherein the quantity of filtration material is positioned external of the filter pass-through tube and in fluid communication with one or more of the plurality of dispersion ports and the plurality of collection ports.

2. The filtration apparatus of claim 1, wherein the filter chamber is enclosed with glass tube sidewall.

3. The filtration apparatus of claim 1, wherein the plurality of dispersion ports and/or the plurality of collection ports are spaced radially along the filter pass-through tube.

4. The filtration apparatus of claim 1, wherein the plurality of dispersion ports are positioned at two or more vertical levels within a sidewall of the filter pass-through tube and/or the plurality of collection ports are positioned at two or more vertical levels within the sidewall of the filter pass-through tube.

5. The filtration apparatus of claim 1, wherein the blockage structure is positioned a spaced distance along the filter pass-through tube from each of the dispersion ports and the collections ports.

6. The filtration apparatus of claim 1, wherein a floor of the blockage structure, formed as a surface of the blockage structure, is substantially concave.

7. The filtration apparatus of claim 1, wherein a first portion of the filter pass-through tube on the first side of the blockage structure is substantially coaxial with a second portion of the filter pass-through tube on the second side of the blockage structure.

8. The filtration apparatus of claim 1, wherein the inlet port is positioned through a bowl.

9. The filtration apparatus of claim 8, wherein the bowl further comprises a bowl portion having a filter positioned at a bottom thereof.

10. The filtration apparatus of claim 1, wherein the blockage structure is positioned a spaced distance along the filter pass-through tube from the dispersion ports, thereby forming a collector area for collecting tar byproducts of the quantity of smoke.

11. A smoking apparatus comprising:
    a bowl capable of holding a smoking substance;
    a water-impervious vessel having a stem extending therefrom, wherein the bowl is in fluid communication with the stem;
    a filtration apparatus positioned in fluid communication with the stem, the filter apparatus having:
    an inlet port and an outlet port, wherein the inlet port is positioned through the bowl;
    a filter pass-through tube connected between the inlet and outlet ports, the filter pass-through tube having a blockage structure therein;
    a plurality of dispersion ports positioned on a first side of the blockage structure;
    a plurality of collection ports positioned on a second side of the blockage structure; and
    a filter chamber having a quantity of filtration material positioned external of the filter pass-through tube and in fluid communication with the plurality of dispersion and collection ports; and a draw tube in fluid connection with the water-impervious vessel.

12. The smoking apparatus of claim 11, wherein the filter chamber is enclosed with glass tube sidewall.

13. The smoking apparatus of claim 11, wherein the plurality of dispersion ports and/or the plurality of collection ports are spaced radially along the filter pass-through tube.

14. The smoking apparatus of claim 11, wherein the plurality of dispersion ports are positioned at two or more vertical levels within a sidewall of the filter pass-through tube and/or the plurality of collection ports are positioned at two or more vertical levels within the sidewall of the filter pass-through tube.

15. The smoking apparatus of claim 11, wherein the blockage structure is positioned a spaced distance along the filter pass-through tube from each of the dispersion ports and the collections ports.

16. The smoking apparatus of claim 11, wherein a floor of the blockage structure, formed as a surface of the blockage structure, is substantially concave.

17. The smoking apparatus of claim 11, wherein a first portion of the filter pass-through tube on the first side of the blockage structure is substantially coaxial with a second portion of the filter pass-through tube on the second side of the blockage structure.

18. The smoking apparatus of claim 11, wherein the bowl holds the smoking substance within a bowl portion having a filter positioned at a bottom thereof.

19. A filtration apparatus for use in filtering smoke within a smoking apparatus, the filtration apparatus comprising:

an inlet port and an outlet port, the inlet port receiving a quantity of smoke from a smoking substance;

a filter pass-through tube connected between the inlet and outlet ports, the filter pass-through tube having a blockage structure therein;

a plurality of dispersion ports positioned on a first side of the blockage structure;

a plurality of collection ports positioned on a second side of the blockage structure; and a filter chamber having a quantity of filtration material, the filtration material being a non-liquid filtration substance, wherein the quantity of filtration material is positioned external of the filter pass-through tube and in fluid communication with one or more of the plurality of dispersion ports and the plurality of collection ports, wherein the quantity of smoke moves within the filter pass-through tube, exits the plurality of dispersion ports, passes through the non-liquid filtration substance of the quantity of filtration material to thereby filter the quantity of smoke, and enters the plurality of collection ports.

20. The filtration apparatus of claim 19, wherein the plurality of dispersion ports are spaced radially along the filter pass-through tube, and are positioned at two or more vertical levels within a sidewall of the filter pass-through tube and/or the plurality of collection ports are spaced radially along the filter pass-through tube, and are positioned at two or more vertical levels within the sidewall of the filter pass-through tube.

* * * * *